(12) United States Patent
Chi

(10) Patent No.: US 8,530,561 B2
(45) Date of Patent: Sep. 10, 2013

(54) NONMETAL MATERIAL MODIFIED THERMOPLASTIC RESIN COMPOSITE AND A METHOD FOR PREPARING PRODUCTS USING SAID COMPOSITE

(75) Inventor: Liqun Chi, Shanghai (CN)

(73) Assignees: Shanghai Huda Investment & Development Co., Ltd., Shanghai (CN); Qinghai Xiwang Hi-Tech & Material Co., Ltd., Xining (CN)

( * ) Notice: Subject to any disclaimer, the term of this patent is extended or adjusted under 35 U.S.C. 154(b) by 197 days.

(21) Appl. No.: 13/073,704

(22) Filed: Mar. 28, 2011

(65) Prior Publication Data

US 2011/0316187 A1 Dec. 29, 2011

(30) Foreign Application Priority Data

Jun. 29, 2010 (CN) .......................... 2010 1 0214298

(51) Int. Cl.
*C08K 3/26* (2006.01)
(52) U.S. Cl.
USPC .......................................... 524/427; 524/456
(58) Field of Classification Search
USPC ................................................ 524/427, 456
See application file for complete search history.

(56) References Cited

FOREIGN PATENT DOCUMENTS

| CN | 1167741 A | 12/1997 |
|---|---|---|
| CN | 1563170 A | 1/2005 |
| CN | 2926350 Y | 7/2007 |
| CN | 101597406 A | 12/2009 |

OTHER PUBLICATIONS

Li Zhen et al. Study on Properties of Mechanochemical Modified Wallastonite/Polypropylene System . China Plastics Industry. vol. 31, No. 9, Part 1: Experimental part, Sections 2.1 and 2.6 of Part 2: Results and Analysis, Sep. 2003 (English abstract on third page of attachment).
International Preliminary Report on Patentability for PCT/CN2010/001211, dated Sep. 15, 2003.
International Search Report for PCT/CN2010/001211, dated Apr. 11, 2011.

*Primary Examiner* — Peter Szekely
(74) *Attorney, Agent, or Firm* — Oliff & Berridge, PLC

(57) ABSTRACT

The invention relates to nonmetal material modified thermoplastic resin composite, comprising the following materials by weight percentages: 50-70% of filling, 25-40% of polypropylene, 3-6% of maleic anhydride modified polypropylene, 1-3% of titanium dioxide and 1-2% antioxidant. Said filling has been modified by stearic acid. The invention also provides a method for producing products like sanitary wares, hardware of sanitary wares, outdoor products, decorative pipes of external walls and decorations of public scenes using the nonmetal material modified thermoplastic resin composite. The raw materials are widely available and the preparation does not require long-time burning with high energy consumption, thus possessing the advantages such as low energy consumption, high mechanical automation degree, low labor intensity, and high yield, which is applicable to industrial mass production. The invented nonmetal material modified thermoplastic resin composite is applicable to the production of sanitary wares, hardware of sanitary wares, outdoor products, decorative pipes of external walls and decorations of public scenes.

6 Claims, No Drawings

NONMETAL MATERIAL MODIFIED THERMOPLASTIC RESIN COMPOSITE AND A METHOD FOR PREPARING PRODUCTS USING SAID COMPOSITE

FIELD OF THE INVENTION

The invention relates to a thermoplastic resin composite, in particular to a wollastonite and calcium carbonate modified thermoplastic resin composite and a method for preparing products using the composite. The composite can be applied to produce sanitary wares, hardware of sanitary wares, outdoor products, and decorative pipes of external walls and decorations of public scenes.

BACKGROUND OF THE INVENTION

Common sanitary wares including bathtubs, counter basins, toilets and urinals are manufactured by firing molded figuline, glazing their surfaces and sintering them. Such process requires a great deal of coal or natural gas, causing massive carbon emission and energy consumption which seriously pollute the air. Furthermore, asymmetrical temperature may crack and deform the products during firing, resulting in numerous defective and unqualified products and causing secondary pollution and an increase in cost. In addition, the decreasing figuline resource will disable production of ceramic sanitary wares when it is exhausted.

Recently, some try to produce sanitary wares by man-made agate or acrylic. See details in Chinese patent of invention: Acrylic Toilet Made by Pouring Process (patent No. ZL200410040962.6 and Number of authorized announcement of the invention: CN126923C). Components of the toilet are made by pouring mixture of resin and agate powder into an empty interlayer. Although the products have the general characteristics of ceramic products, the process is complicated and requires plenty of petroleum byproducts and the products are not satisfying in practicability and self-cleaning ability. Another patent relating to toilet with composite structure of acrylic and glass fiber reinforced plastic is developed on the basis of the former one. See details in Chinese patent of utility model: Toilet with Composite Structure of Acrylic and Glass Fiber Reinforced Plastic (patent No. ZL200620034821.8 and Number of authorized announcement of the invention: CN2926350Y). The product looks like plastic and is not satisfying in appearance, durability and practicability.

Chinese patent of invention discloses products made of artificial marble and preparation method thereof (application No. 96106392.0 and publication No.:CN1167741A). The product is made by pouring marble powder, unsaturated polyester resin, aluminum hydroxide and wollastonite. The performance of the product and the production process are improved, but the product is still not satisfying in weight, technological practicability, smoothness and fineness, besides the low labor efficiency which disables industrial mass production.

SUMMARY OF THE INVENTION

The invention provides a nonmetal material modified thermoplastic resin composite. Products made of the composite, like sanitary wares, hardware of sanitary wares, outdoor products, decorative pipes of external walls and decorations of public scenes, are featured with low carbon, low energy consumption, no pollution, good toughness, high intensity, and excellent smoothness and fineness.

To achieve the goal above, the invention provides a nonmetal material modified thermoplastic resin composite, comprising materials by weight percentages as follows:
50-70% of fillers;
25-40% of polypropylene;
3-6% of maleic anhydride modified polypropylene;
1-3% of titanium dioxide;
and 1-2% antioxidant,
wherein said fillers have been modified by stearic acid.

The fillers are wollastonite, calcium carbonate or mixture of them.

Said modification refers to mixing and stirring of stearic acid (with weight percentage of 1~5%) and fillers (with weight percentage of 95~99%) at the temperature of 90° C.-100° C for 15-30 min by using high-speed mixer to allow full mixing and colliding of the stearic acid and the fillers, so as to achieve the purpose of modifying granule in the surface. The modified calcium carbonate and wollastonite can fully combine with polypropylene, which greatly improves the compatibility among different materials, reduces the surface oil absorption of calcium carbonate and wollastonite, greatly increases the appending proportion of calcium carbonate and wollastonite, and gives the advantage of high-load fillers of modified nonmetal thermoplastic resin composite. The modified nonmetal materials possess high compatibility and high-load fillers capacity, and bathroom products made by said modified nonmetal thermoplastic resin composite enjoy the advantages of hardness, high strength and corrosion-resistant capacity and the tactile impression as that of natural stone.

The wollastonite is a nontoxic inorganic acicular mineral with good chemical corrosion resistance, thermal stability, dimensional stability, vitreous and pearl luster and low water and oil absorbing capacity. It can strengthen the product due to its good mechanical property and electrical property. The calcium carbonate can be sufficiently melted with polypropylene when it is unmodified, and is inexpensive, making it another idea fillers besides wollastonite. By using wollastonite or calcium carbonate of different specifications or mixtures thereof, the invention ensures the compactness of the composite and saves adhesive.

Polypropylene is used as an adhesive of the thermoplastic composite. It has high crystallinity, small relative density (about 0.90-0.91 g/cm$^2$), melting point of 170-175° C. and molecular weight of 0.15-0.7 million. It has good heat resistance in macrocosm with a heat distortion temperature of 90-105° C. As a nonpolar high polymer, the polypropylene has good electrical resistance property and good thermal stability. Moreover, it is chemically stable since it hardly absorbs water and is nonreactive with acids except with strong oxidizing acids (oleum, nitrosonitric acid) and is resistant to bases. It is better than polyethylene in rigidity and intensity and has extremely outstanding fatigue bending resistance. However, it exhibits greater creep strain than polyamide and polyvinyl chloride.

Furthermore, the polypropylene is M700, M2600 or a mixture of them. Different polypropylenes or mixtures can be applied to production as adhesives according to rigidity and absorbability of the products.

The thermoplastic resin is usually simple and convenient to process and has high mechanical energy, but its heat resistance and rigidity are not satisfying. The wollastonite, calcium carbonate or a mixture thereof not only improves mechanical property, heat distortion temperature, dimensional stability, low temperature impact property and ageing property of the thermoplastic resin composite, but also has some properties beyond those of thermosetting glass fiber reinforced composite, while such composite can still be applied to injection forming.

Content of the fillers is 50-70%. Generally speaking, the thermoplastic resin composite modified by wollastonite, calcium carbonate or a mixture thereof has: (i) improved elasticity modulus, creep resistance and mechanical strengths like tensile-strength, bending strength and compressive strength, (ii) increased heat distortion temperature, (iii) lowered coefficient of linear expansion, (iv) lowered water absorbing capacity and improved dimensional stability, (v) improved heat conductivity, (vi) improved rigidity, (vii) ability to inhibit stress crack, (viii) fire resistance and (ix) improved electrical property.

The maleic anhydride modified polypropylene is formed by grafting polypropylene and maleic anhydride through extrusion. It can increase adhesiveness and compatibility between polar materials and nonpolar materials due to the introduction of strongly polar lateral groups into the nonpolar main chain. Maleic anhydride used during the production of filled polypropylene can greatly improve affinity of the fillers for polypropylene and dispersion of the fillers, thus the fillers can be better dispersed in the polypropylene, increasing tensile-strength and impact strength of the filled polypropylene.

Titanium dioxide is used for whitening

The tertiary carbon atoms in the polypropylene are very sensitive to oxygen, making polypropylene prone to ageing when being exposed to heat, light and air. Therefore, an antioxidant is used to prevent ageing.

The invention also provides a method for preparing products like sanitary wares, hardware of sanitary wares, outdoor products, decorative pipes of external walls and decorations of public scenes using the nonmetal material modified thermoplastic resin composite, comprising the following steps:

Step 1: uniformly mixing polypropylene, maleic anhydride modified polypropylene, titanium dioxide, fillers and antioxidant according to given amounts by a mixer;

Step 2: feeding the mixture into a hopper of a double-screw extruder and forming the mixture thermally;

Step 3: extruding thermally formed strips by the double-screw extruder and cooling them;

Step 4: feeding the strips into a granulator to form grains;

Step 5: drying the grains in an oven;

Step 6: feeding the grains into a charging barrel of an injection machine, melting the grains and injecting the composite from the charging barrel into a metal mould of the product by the injection machine;

Step 7: injecting cooling water into cold runner of the mould to cool and form the product;

Step 8: opening the mould and taking out the formed product.

In particular, the injection machine used in step 6 injects the melted grains into the metal mould by a piston cylinder through high pressure.

The temperature of the cooling water used in step 7 is 5-10° C.

The product is formed by steps as follows: preparing composite grains of polypropylene and high-quality wollastonite, calcium carbonate or a mixture thereof with more than 95% whiteness using the extruder and granulator, melting the grains, injecting the melt into a mould by the injection machine and cooling the melt. The preparation method uses materials which are widely available, greatly lowers energy consumption since it does not need long-time firing with high energy, and reduces labor intensity through high mechanical automation. Compared with traditional techniques, the invention has advanced technique and adopts injection machine, thus the percentage of pass is high, no defective product will be produced and the method can be applied to industrial mass production. Additionally, the products made by the method and composite are thin, light and as smooth as mirrors, have good resistance to dirt, good self-cleaning ability, and high toughness and intensity.

The thermoplastic resin composite and method for preparing products using the composite can be applied to produce sanitary ware series, hardware series of sanitary wares, outdoor product series, decorative pipe series of external walls and decoration series of public scenes.

EXAMPLES

The technical proposal is further described by the following embodiments:

The method for preparing products using the nonmetal material modified thermoplastic resin composite comprises the following steps:

Step 1: uniformly mixing the polypropylene, maleic anhydride modified polypropylene, titanium dioxide, fillers and antioxidant according to given amounts by a mixer;

Step 2: feeding the mixture into a hopper of a double-screw extruder and forming the mixture thermally;

Step 3: extruding thermally formed strips by the double-screw extruder and cooling them;

Step 4: feeding the strips into a granulator to form grains;

Step 5: drying the grains in an oven;

Step 6: feeding the dry grains into a charging barrel of an injection machine, melting the grains, inputting the amount of material for a single product into a computer which controls the injection machine, starting the injection control program, and injecting the composite into a metal mould by injection screws, wherein the injection machine injects the melt into the metal mould by a piston cylinder through high pressure;

Step 7: injecting 5-10° C. cooling water into cold runner of the mould to cool and form the product;

Step 8: opening the mould and taking out the formed product.

The calcium carbonate and wollastonite used in the following examples are modified, namely pretreated through high-speed mixing by adding stearic acid (1.5%, C16H32O2, and melting point of 69.6° C.) and calcium carbonate or wollastonite (98.5%) into the high-speed mixer, heating the high-speed mixer to 90° C.-100° C. to melt the stearic acid and to fully contact and collide with the calcium carbonate or wollastonite for 15~30 min, stopping stirring and mixing and completing the modification procedure. The modified calcium carbonate and wollastonite can fully combine with polypropylene, which greatly improves the compatibility among different materials, lowers the surface oil absorption of calcium carbonate and wollastonite, greatly increase the appending proportion of calcium carbonate and wollastonite and gives the advantage of high-load fillers to modified nonmetal thermoplastic resin composite. The modified nonmetal materials possess high compatibility and high-load fillers capacity, and bathroom products made by said modified nonmetal thermoplastic resin composite enjoy the advantages of hardness, high strength and corrosion-resistant capacity, and a tactile impression as that of natural stone.

Embodiments using different prescriptions are described below.

| Embodiment 1 | |
|---|---|
| Based on weight percentage: | |
| 1250-mesh wollastonite powder | 50%, |
| M700 polypropylene particles | 15%, |
| M2600 polypropylene particles | 25%, |
| MAH-G-PP maleic anhydride modified polypropylene | 5%, |
| CR-834 titanium dioxide | 3%, |
| and antioxidant 1010 | 2%. |

The product is made by the following steps: uniformly mixing the materials according to given amounts by a mixer, feeding the mixture into a hopper of a double-screw extruder through a feed inlet and a bypass feed inlet qualitatively, forming the mixture thermally, extruding the thermally formed strips by die orifice of an extruder and cooling them to room temperature in a water tank, making the strips into grains by a granulator, drying the grains in an oven at 100-120° C. to remove all the water, feeding the dry grains into a charging barrel of an injection machine, melting the grains, inputting amount of material for a single product into computer which controls the injection machine, starting the injection control program, and injecting the composite into a metal mould by injection screws, wherein the injection machine injects the melted grains into the metal mould by a piston cylinder through high pressure, injecting 5-10° C. cooling water into cold runner of the mould to cool and form the product, opening the mould and taking out the formed product by a manipulator.

The product formed in the embodiment is light, thin, smooth and resistant to high temperature and corrosion, and has good impact strength, compressive strength and self-cleaning ability.

| Embodiment 2 | |
|---|---|
| Based on weight percentage: | |
| 1250-mesh wollastonite powder | 40%; |
| 325-mesh wollastonite powder | 20%; |
| M700 polypropylene particles | 12%; |
| M2600 polypropylene particles | 18%; |
| MAH-G-PP maleic anhydride modified polypropylene | 5%; |
| CR-834 titanium dioxide | 3%; |
| and antioxidant 1010 | 2%. |

The product is made by the following steps: uniformly mixing the materials according to given amounts by a mixer, feeding the mixture into a hopper of a double-screw extruder through a feed inlet and a bypass feed inlet qualitatively, forming the mixture thermally, extruding the thermally formed strips by die orifice of an extruder and cooling them to room temperature in a water tank, making the strips into grains by a granulator, drying the grains in an oven at 100-120° C. to remove all the water, feeding the dry grains into a charging barrel of an injection machine, melting the grains, inputting amount of material for a single product into computer which controls the injection machine, starting the injection control program, and injecting the composite into a metal mould by injection screws, wherein the injection machine injects the melted grains into the metal mould by a piston cylinder through high pressure, injecting 5-10° C. cooling water into cold runner of the mould to cool and form the product, opening the mould and taking out the formed product by a manipulator.

The product formed in the embodiment is resistant to dirt and has good self-cleaning ability, good toughness, good impact strength and compressive strength. It always keeps the normal temperature without making users feel cold.

| Embodiment 3 | |
|---|---|
| Based on weight percentage: | |
| 1250-mesh wollastonite powder | 40%; |
| 325-mesh calcium carbonate powder | 20%; |
| 100-mesh calcium carbonate powder | 10%; |
| M700 polypropylene particles | 10%; |
| M2600 polypropylene particles | 15%; |
| MAH-G-PP maleic anhydride modified polypropylene | 3%; |
| CR-834 titanium dioxide | 1%; |
| and antioxidant 1010 | 1%. |

The product is made by the following steps: uniformly mixing the materials according to given amounts by a mixer, feeding the mixture into a hopper of a double-screw extruder through a feed inlet and a bypass feed inlet qualitatively, forming the mixture thermally, extruding the thermally formed strips by die orifice of an extruder and cooling them to room temperature in a water tank, making the strips into grains by a granulator, drying the grains in an oven at 100-120° C. to remove all the water, feeding the dry grains into a charging barrel of an injection machine, melting the grains, inputting amount of material for a single product into a computer which controls the injection machine, starting the injection control program, and injecting the composite into a metal mould by injection screws, wherein the injection machine injects the melted grains into the metal mould by a piston cylinder through high pressure, injecting 5-10° C. cooling water into cold runner of the mould to cool and form the product, opening the mould and taking out the formed product by a manipulator.

The product formed in the embodiment resists water and surface dirt, has high rigidity, good impact strength, and wearing quality, and greatly improved thermal insulation property.

The thermoplastic resin composite and the method for preparing products using the composite can be widely applied to produce sanitary ware series, hardware series of sanitary wares, outdoor product series, decorative pipe series of external walls and decoration series of public scenes.

| Embodiment 4 | |
|---|---|
| Based on weight percentage: | |
| 1250-mesh calcium carbonate | 18%; |
| 325-mesh calcium carbonate | 26%; |
| 80-mesh calcium carbonate | 26%; |
| M700 polypropylene particles | 10%; |
| M2600 polypropylene particles | 15%; |
| MAH-G-PP maleic anhydride modified polypropylene | 3%; |
| CR-834 titanium dioxide | 1%; |
| and antioxidant 1010 | 1%. |

The product is made by the following steps: uniformly mixing the materials according to given amounts by a mixer, feeding the mixture into a hopper of a double-screw extruder through a feed inlet and a bypass feed inlet qualitatively, forming the mixture thermally, extruding the thermally formed strips by die orifice of an extruder and cooling them to room temperature in a water tank, making the strips into grains by a granulator, drying the grains in an oven at 100-120° C. to remove all the water, feeding the dry grains into a charging barrel of an injection machine, melting the grains, inputting amount of material for a single product into computer which controls the injection machine, starting the injection control program, and injecting the composite into a metal mould by injection screws, wherein the injection machine injects the melted grains into the metal mould by a piston cylinder through high pressure, injecting 5-10° C. cooling water into cold runner of the mould to cool and form the product, opening the mould and taking out the formed product by a manipulator.

The product formed in the embodiment has granular crystals on its surface which looks like natural marble, thereby giving a better stereoscopic impression. It also shows rigidity and firm feel as natural stone when being knocked.

The sanitary wares include washbasin, bathtubs, toilet, bidet, urinal, shower pan and so on, the hardware of sanitary wares includes taps for washbasin and bathtub, shower head, drainage of washbasin and bathtub, tap of kitchen sink, floor drain, shell of water meter and so on, the outdoor products include desk, chair, decorations of public scenes like flowerpot and so on, and the decorative pipes of external walls can be square, round, diamond, rectangular and so on.

The invention shall not be limited by the description above despite that it has been introduced in details through the preferable embodiments. Since a skilled person in the art can easily prepare derivatives of the invention by modification or replacement after reading the description above, the scope of protection shall be defined by the claims.

The invention claimed is:

1. A nonmetal material modified thermoplastic resin composite which comprises materials by weight percentages as follows:
   50-70% of fillers;
   25-40% of polypropylene;
   3-6% of maleic anhydride modified polypropylene;
   1-3% of titanium dioxide;
   and 1-2% antioxidant;
   wherein the fillers has been modified by stearic acid, wherein said modification refers to mixing and stirring of stearic acid (with weight percentage of 1~5%) and the fillers (with weight percentage of 95~99%) at the temperature of 90° C.-100° C. for 15-30 min by using a high-speed mixer to achieve full mixing and colliding of the stearic acid and the filters.

2. A nonmetal material modified thermoplastic resin composite of claim 1, wherein the fillers comprises wollastonite, calcium carbonate or a mixture of wollastonite and calcium carbonate.

3. A nonmetal material modified thermoplastic resin composite of claim 1, wherein said composite can be applied to produce sanitary wares hardware of sanitary wares, outdoor products, and decorative pips of outside walls and decorations of public scenes.

4. The nonmetal material modified thermoplastic resin composite of claim 1, wherein a process for preparing said composite comprises steps as follows:
   step 1: uniformly mixing the polypropylene, maleic anhydride modified polypropylene, titanium dioxide, the fillers and antioxidant according to weight percentages in claim 1 by a mixer;
   step 2: feeding the mixture into a hopper of a double-screw extruder and forming the mixture thermally;
   step 3: extruding thermally formed strips by the double-screw extruder and cooling them;
   step 4: feeding the strips into a granulator to form grains;
   step 5: drying the grains in an oven;
   step 6: feeding the grains into a charging barrel of an injection machine, melting the grains and injecting the composite from the charging barrel into a metal mould of the product by the injection machine;
   step 7: injecting cooling water into cold runner of the mould to cool and form the product;
   step 8: opening the mould and taking out the formed product.

5. The nonmetal material modified thermoplastic resin composite of claim 4, wherein the injection machine used in step 6 injects the melted grains into the metal mould by a piston cylinder through high pressure.

6. The nonmetal material modified thermoplastic resin composite of claim 4, wherein the temperature of the cooling water used in step 7 is 5-10° C.

* * * * *